INVENTOR.
W. GROOTEBOER

Dec. 15, 1964   W. GROOTEBOER   3,161,860
FERRITE MATRIX STORING DEVICES WITH INDIVIDUAL CORE
READING AND INTERFERENCE-PULSE COMPENSATION
Filed Nov. 10, 1959   14 Sheets-Sheet 4

Fig. 6

INVENTOR.
W. GROOTEBOER
BY
Attorney

Dec. 15, 1964 W. GROOTEBOER 3,161,860
FERRITE MATRIX STORING DEVICES WITH INDIVIDUAL CORE
READING AND INTERFERENCE-PULSE COMPENSATION
Filed Nov. 10, 1959 14 Sheets-Sheet 7

Fig.9

INVENTOR.
W. GROOTEBOER
BY
Attorney

United States Patent Office 3,161,860
Patented Dec. 15, 1964

3,161,860
FERRITE MATRIX STORING DEVICES WITH INDIVIDUAL CORE READING AND INTERFERENCE-PULSE COMPENSATION
Wilhelm Grooteboer, Duisdorf, near Bonn, Germany, assignor to International Standard Electric Corporation, New York, N.Y., a corporation of Delaware
Filed Nov. 10, 1959, Ser. No. 852,030
Claims priority, application Germany, Nov. 19, 1958, St 14,466
6 Claims. (Cl. 340—174)

This invention refers to an arrangement of ferrite matrix storing devices consisting of a plurality of partial matrices similarly wired. One important problem in designing such storing devices is to compensate for the interference pulses induced in the reading loop by the selection pulses' magnetic fields. As referred to here, these are the magnetic fields surrounding the row and column selecting wires and the fields in the half-marked cores of the selected row and column.

As is known, interference pulses can be compensated by switching means outside the matrix or by so leading the reading loop through the individual cores that the interference pulses mutually compensate one another. Interference-pulse compensation by suitable arrangement of the reading wire has proved to be effective, particularly in the case of large matrices. However, in that case, it must be remembered that the output signals are either positive or negative, depending on the core's position.

Figure 1:
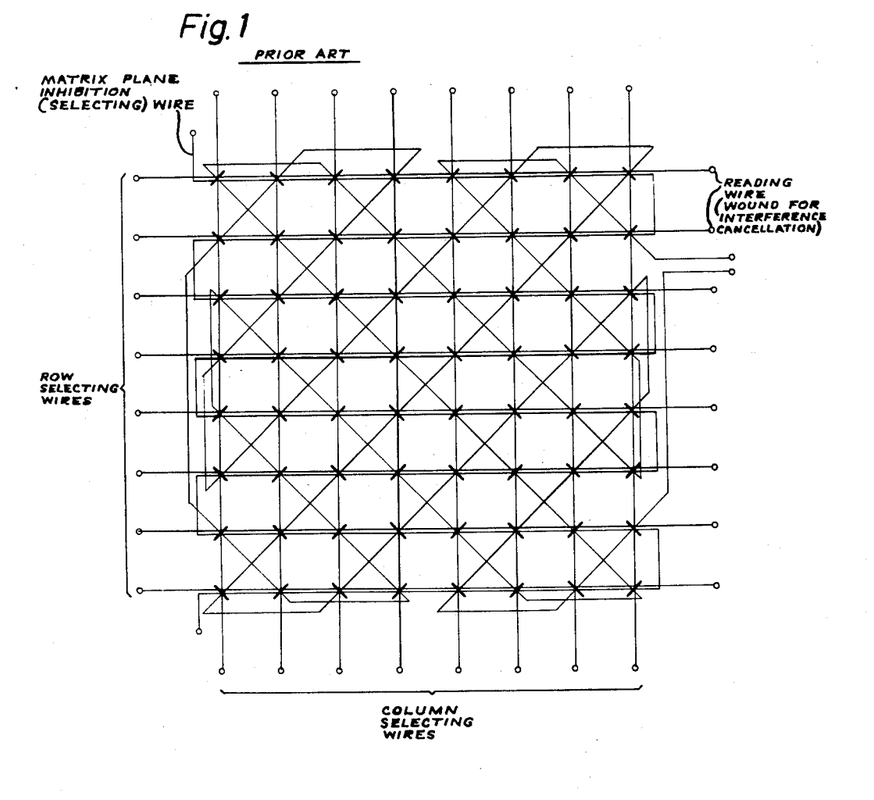
FIG. 1 shows a known ferrite core matrix with reading wire and inhibition wire.

FIG. 1 shows a storing device of this type known to the art for some time. In this case the reading wire runs diagonally and is very difficult to thread in the manufacturing process, thus making it a considerable cost factor. Furthermore, it must also be borne in mind that the reading wire must be led with extreme accuracy over the selection wires' (row and column wires') crossing points. In order to see that the neatly threaded reading wire stays in position, it must be somehow fastened and the easiest way to do this is to spray the matrix with lacquer immediately after threading. However, the drawback of such a matrix is that if any one core proves to be faulty when tested, the entire matrix is unserviceable. In an unsprayed matrix it would still be possible to replace the core, although this would be rather difficult.

The object of the invention is to provide a ferrite matrix storing device wherein interference-pulse compensation occurs within the storing device itself and wherein the structural arrangement of the individual partial matrices can be chosen at random.

The object of the invention is a ferrite matrix storing device with individual core reading, consisting of a plurality of identical matrices each wired without regard to the preponderance of positive or negative interference signals. In a storing device circuit, according to the invention, made up of two or four partial matrices, with the row and column wires of each two partial matrices properly selected for direction of passage of call-up pulses, the reading wires are wound in mirror-image fashion through all the partial matrices, and according to the signs of the interference signals induced in them, are connected in series opposition to form a common reading loop, so that interference signals produced in cores in mirror-image positions in adjacent matrices compensate one another in the common reading loop, while the call-up pulses cause a writing or reading action in only one of the partial matrices at a time. The advantage of such a storing device circuit is that the partial matrices used can be so wired, without regard to the interference signals, for example, that all cores of the partial matrix produce reading signals of like polarity. As the embodiments to be described later will show, the reading wire can also serve as an inhibition wire in these partial matrices.

A ferrite matrix storing device arranged according to the invention has the further great advantage of requiring only one-half the through-switches for the row or column call-up, since in each case the row or column wires are passed through two partial matrices and are actuated at the same time over the same through-switch.

The partial matrix wiring is preferably so chosen that the reading wire runs parallel to the row or column wires. This substantially reduces manufacturing costs. The embodiments will show that the wires and cores need not be fixed by spraying with lacquer to ensure good interference-pulse compensation. This means further savings, for a faulty core can be rather easily replaced by removing only the wires of one row and column.

The nature of the invention and various desirable embodiments will now be described with reference to the accompanying drawings, wherein.

Figures 2, 3:
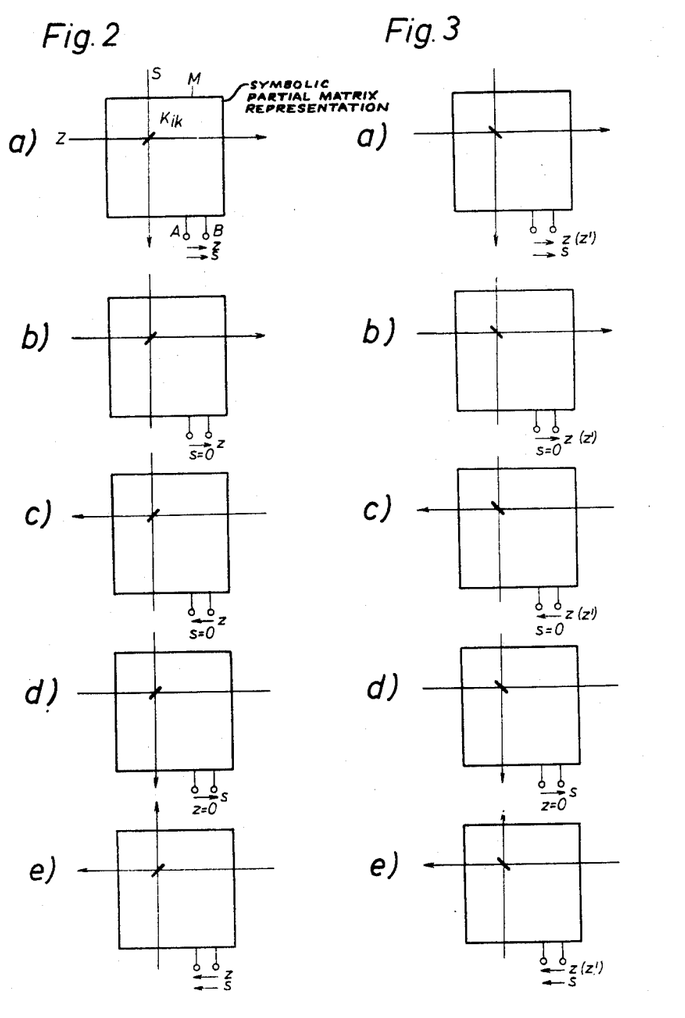
FIGS. 2a–2e show simplified diagrams of a storing device matrix with reading wire arranged at will and under various operating conditions.
FIGS. 3a–3e show the storing device matrices according to FIGS. 2a–2e with cores turned 90°.

The connecting of partial matrices into storing device arrangements according to the invention will now be described with reference to the block diagrams shown in FIG. 2.

FIG. 2a shows a much simplified symbol for a partial matrix with $n$ rows and $m$ columns. The matrix itself is represented by a square field M. Furthermore, only one row wire Z and one column wire S are shown and the call-up pulses' direction of passage is indicated by arrows. In what follows, the direction of the arrows shown in FIG. 2a will be termed positive. A core has been drawn in at the crossing point of the $i^{\text{th}}$ row wire Z and the $j^{\text{th}}$ column wire S; it is located in the coincidence position for positive row and column call-up pulses. On the lower edge of matrix M there are two connection terminals A and B that connect to the reading wire. The reading wire itself is not shown. It is assumed, of course, that it passes through all cores of the matrix. For the time being, however, no assumptions will be made as to just how the wiring runs in detail. Considering now a core with row number $i$ and column number $k$, $K_{ik}$ in FIG. 2a for example, and at the same time assuming positive row and column call-up, a reading signal is found to appear at terminals A and B, provided the core undergoes reverse saturation when called up. If positive row and column call-up pulses are again applied, this core can no longer undergo reverse saturation. However, a signal does appear at output terminals A and B, and in what follows it will be called an interference signal. It consists substantially of two portions. The one portion is caused by the row call-up pulse and the other by the column call-up pulse. Both portions will hereinafter be termed row interference signal $z$ and column interference signal $s$.

In FIG. 2a, $z$ and $s$ are indicated under terminals A and B by direction arrows. In the example under consideration it is assumed that both interference signals are positive. Direction arrows z and s in the drawing therefore run from left to right.

If only a row call-up pulse were applied to the matrix, as FIG. 2b shows, all cores of the line with number i would be half called-up and only interference signal z would be present at terminals A and B. In this case, the column interference signal is s=0. However, if a call-up pulse of opposite polarity is applied to the row wire, the sign of interference signal z is also reversed, as FIG. 2c shows. The same holds true for the row call-up. FIG. 2d shows the case where a positive call-up pulse is applied only to the column wire. The result is then a positive interference signal s but no row interference signal, z=0.

If negative call-up pulses are applied at the same time to the row wire and the column wire, both interference signals then have the opposite sign, as shown in FIG. 2e.

For connecting partial matrices into storing device arrangements according to the invention, still further definitions are required with regard to the matrix symbol. If one partial matrix differs from another *only* in that the cores of the one partial matrix with respect to those of the other are shifted 90° in position, one symbol is taken for both partial matrices, which differs only by the position of core $K_{ik}$ shown in the drawing and possibly by the change connected therewith in the magnitude and direction of interference signals z and s. Compare FIG. 2 with FIG. 3.

The partial matrix of FIG. 3a, just as that of FIG. 2a, is also controlled with positive recording pulses, but core $K_{ik}$, since its position with respect to FIG. 2a is shifted 90°, is no longer in coincidence position. In that case, the definition should hold that either the interference signals z and s are the same in FIG. 2a and FIG. 3a or the row interference signal of the matrix in FIG. 3a differs from that of the matrix in FIG. 2a depending on the magnetic winding sense of the reading wire. This is indicated by z (z'). As will be established later, when the reading wire is run parallel to the rows or columns and when the core position is changed in accordance with FIGS. 2a and 3a, generally no change occurs in both interference signals z and s. There is either no change or only change in the column- or the row interference signal. FIGS. 3a–c therefore take into account in each case the possibility of two different interference signals z and z', of which interference signal z agrees with the one given in the corresponding FIGS. 2a–e. A matrix symbol can of course also be used in its mirror-image representation wherein the reading wire threads in mirror image fashion with reference to the reading wire of FIG. 2a, as will become apparent from the further discussion thereof below.

The basic design of a storing device circuit according to the invention will now be explained with reference to the schematic in FIGS. 2 and 3.

Figure 4:
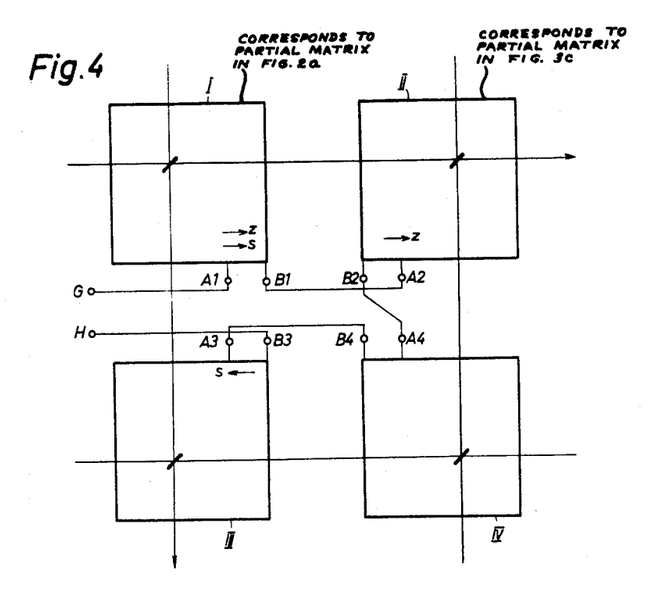
FIG. 4 shows a storing device circuit arranged according to the invention, with four partial matrices.

FIG. 4 shows, as a first embodiment, a storing device circuit with four partial matrices. The matrices I–IV correspond to the partial matrices in FIGS. 2 and 3, the reading wire patterns in matrices II–IV being mirror-image representations of that in matrix I corresponding to FIG. 2a. The row and column wires of adjacent matrices are so connected in pairs that the call-up pulses that in each case can be applied to a row and a column wire of a partial matrix can at the same time be applied to the proper row wire of another partial matrix and to the proper column wire of still another partial matrix. Furthermore, the reading wires of all partial matrices are connected in series. In the example given in FIG. 4, a core in matrix I is being called up. Positive call-up pulses are applied to the corresponding row and column wires. The corresponding row wire of matrix II is connected to the row wire of matrix I and the corresponding column wire of matrix III is connected to the column wire of matrix I. Due to the call-up pulse, a row interference signal z and a column interference signal s arise in matrix I and appear across terminals A1 and B1 of the reading wire of matrix I with the sign indicated by the arrow direction z and s.

In the reading wire of matrix II there occurs only a row interference signal z, which is found at terminals A2 and B2. Likewise, only a column interference signal occurs in matrix III. This is found at terminals A3 and B3. When a core in matrix I is called up, no interference signal is found at terminals A4 and B4 of matrix IV.

In the FIG. 4 arrangement, the reading wires of the four partial matrices are connected in series into a reading loop with the connections G and H in the series A1 B1, A2 B2, A4 B4, A3 B3. In that case, the row interference signals of partial matrices I and II and the column interference signal of partial matrices I and III compensate one another.

From this it follows that the partial matrices II and III, whose cores are shifted 90° with respect to those of partial matrices I and IV in relation to their respective reading wires, must produce similar row interference pulses z as partial matrices I and IV. Thus, in FIG. 4, no matrices should be used in which by shifting the cores 90° a different interence signal (Z') occurs.

If a core in matrix II is called up, the row interference signals of partial matrices I and II compensate one another, as do the column interference signals of partial matrices II and IV. The interference signals also compensate one another when the cores in the other partial matrices are called up.

The advantage of the mirror-image representation of matrices II and III is that the reading wires' connections between partial matrices are not far apart, thereby avoiding excessive signal delays in the reading logs, and their series connection into a closed reading loop is easily traced. Another obvious advantage is the fact that the four partial matrices can be combined in a single matrix whose reading loop contains four sections, the first of which is led through all cores of the matrix's first quadrant, the second through all cores of the second quadrant, etc., and the fourth through all cores of the fourth quadrant.

Since it is only a question of the four partial matrices' electrical hook-up, FIG. 4 can also be so interpreted as if the two partial matrices II and III had been shifted back from their mirror-image positions to their normal position. Then the row wires of matrix I need only be so connected to the column wires of matrix II that the positive call-up pulses applied to matrix I are simultaneously applied to the corresponding row wire(s) of matrix II with opposite direction of passage. The storing device arrangement according to the invention, however, can also be so set up that the row call-up pulse can be applied in the same direction of passage both to partial matrix I and to partial matrix II.

In that case all that would have to be done would be to connect the reading wires of the two partial matrices, not in series, as in FIG. 4 but in opposition, that is, to transpose the connections to terminals A2 and B2.

Of course, exactly the same thing must be done with respect to row interference signal compensation, the result simply being that the reading wires of all partial matrices are then alternately connected in opposition.

If the storing device circuit according to FIG. 4 contains in all $n^2$ cores, each partial matrix or each of the four fields of an $n \times n$ matrix must contain $n/2 \times n/2$ cores. Operation of the storing device circuit then requires in each case $n$ through-switches for the row and column call-up.

The overall requirement is thus $2n$ through-switches for a storing device circuit with $n^2$ cores.

Figure 5:
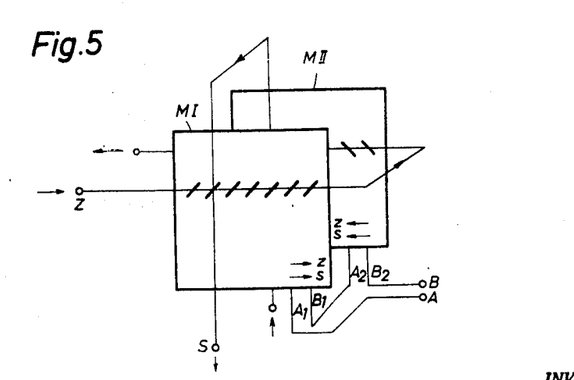
FIG. 5 shows a storing device circuit arranged according to the invention, with two partial matrices.

FIG. 5 shows a particularly favorable embodiment for a storing device circuit according to the invention. This storing device circuit, which is made up of only two partial matrices, will be termed an economical circuit in what follows, since it requires only a relatively small number of through-switches.

The economical circuit is made up of two partial matrices with the same wiring, with the cores of the one partial matrix, considered in relation to the common row and column selecting wires, shifted 90° with respect to those of the other partial matrix. The row and column wires of both partial matrices are so connected that the call-up pulses are applied simultaneously to both partial matrices in opposite magnetic senses, while the reading wires of both partial matrices are connected in series. In the economical circuit according to FIG. 5, the two partial matrices MI and MII are arranged in two different planes. Only one row wire Z and one column wire S are shown. If positive call-up pulses are applied to partial matrix MI, they flow in MI through the row wire from left to right and through the column wire from above to below and at the same time they flow in MII through the row wire from right to left and through the column wire from below to above. Therefore, if MI is operated in row and column with positive call-up pulses, negative call-up pulses are simultaneously applied to MII in row and column. Shifting the cores by 90° causes them to be in coincidence position in MI, while they are not in coincidence position in MII. In FIG. 5 only the cores on the row wire are shown. The call-up pulse direction of flow is marked by arrows. The reading wires with contacts A1, B1 for matrix MI and A2, B2 for matrix MII are connected in series and together form the reading loop with contacts A and B. A comparison with FIGS. 2a and 3e shows that the interference signals also compensate one another in this storing device circuit according to the invention. Matrix MI and its mode of operation correspond to the representation in FIG. 2a and matrix MII corresponds to FIG. 3e. In both arrangements according to FIG. 2a and FIG. 3e, the row and column interference signals are of opposite sign. It is to be noted that shifting the cores by 90° between MI and MII has no effect on the interference signals.

In the economical circuit according to FIG. 5, the total requirement is only $2n$ through-switches for a storing device circuit with $2m^2$ cores.

Thus far, the description has dealt with the basic operation of storing device circuits according to the invention for two embodiments. Each of these embodiments can be altered in many ways by the choice of wiring within the partial matrices.

Figure 6:
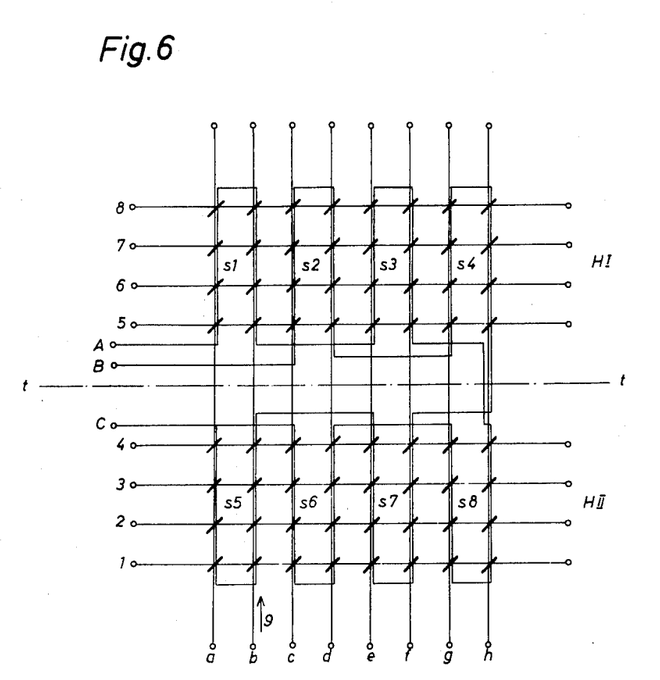
FIGS. 6–12 show embodiments of storing device circuits with 8×8 cores.

FIG. 6 shows an example of a storing device with eight rows 1 . . . 8 and columns $a$ . . . $h$. All the cores are arranged here in the same position; the storing device circuit is split by a separation line $t$—$t$ into two halves HI and HII, since this is advantageous from a manufacturing standpoint The reading wire, beginning at A, passes in half HI through columns $a$, $b$, $e$ and $f$, and then in second half HII through columns $h$, $g$, $d$ and $c$ to center tap C. Thus, in this wiring, two columns are always skipped. From center tap C, the reading wire passes similarly through columns $a$, $b$, $e$, $f$, in HII and $h$, $g$, $d$ and $c$ in HI to contact point B. The reading wire thus forms eight individual loops $s1$ . . . $s8$, which are interlaced. A comparison with FIG. 4 shows that loops $s1$ and $s3$ correspond to partial matrix I, and loops $s2$ and $s4$ to partial matrix II, in that they have common row wires and different column wires. Similarly loops $s5$ and $s7$ correspond to partial matrix III and loops $s6$ and $s8$ to partial matrix IV.

Thus, in this storing device circuit with interlaced reading loops, of the four partial matrices two, whose column (row) wires are connected, are in each case so joined to a matrix HI or HII that the reading loops that pass through the first and second, fifth and sixth, etc., columns (rows) form the reading wire of the one partial matrix and the reading loops that pass through the third and fourth, seventh and eighth, etc., columns (rows) form the reading wire of the other partial matrix.

In order to explain interference pulse compensation, the effect of the column call-up pulses on the interference signal will first be considered. If, for example, a call-up pulse is sent through column wire $b$ in the direction of arrow 9, the individual loops are permeated by the magnetic field of the pulse whose field strength is inversely proportional to the distance from the column wire. The strongest interference signals are thus induced in loops $s1$ and $s5$, weaker interference signals in loops $s2$, $s6$, etc.

However, it must be taken into account that the magnetic flux through loops $s1$ and $s5$ is further increased by the presence of the cores in column $b$. By interlacing the loops the interference signals of loops $s1$ and $s5$, relative to outlet A–B, are made to have opposite polarity. The same holds true for the interference signals of loops $s2$ and $s6$, $s3$ and $s7$, $s4$ and $s8$. Good compensation requires that the interference signal of loop $s1$, for example, coincides well with that of loop $s5$. However, differences in that case cannot be prevented, which occur as a result of the control of the cores' reversible permeability and the various size areas of the individual loops, as well as the varying distance between column wire and reading wire. Experiments have shown that the permeability controls and the varying distances between wires have the greatest effect on the interference signal. The first can be reduced by careful selection of the cores. The latter can be prevented by making the column wires of so-called doped wire that has a thermoplastic sheath. The two wires of a column—call-up wire and reading wire—are heated before threading and then led through a device provided with a notch in which they are pressed together and glued. Column and reading wires then have a set constant spacing. If the position of the two clamped wires changes in the direction of the rows, the area of the individual loop becomes smaller; but since primarily the magnetic field in the vicinity of the conductor is the decisive factor, small changes in the overall area are practically unnoticeable as regards the interference signal.

In explaining interference pulse compensation, it is advisable to determine what effect the row call-up pulses in the arrangement according to FIG. 6 have on the interference signal. If, for example, a call-up pulse is applied to row 1, the interference pulses, coupled through the cores' inductance, compensate one another for every two adjacent cores. The interference portion of core $1a$ compensates the interference portion of core $1b$, etc. The magnetic field in the air around the charged row wire induces an interference portion in the individual loops only if the areas of the individual loops above and below the row wire are different in size. This is particularly true of rows on the matrix edge.

Since the field is strongest in the vicinity of the conductor, most of the interference portion in each individual loop compensates itself. This means that in this case, too, minor lateral shifts of the column wires are of no importance. That interference portion of an individual loop which still remains is compensated by the interference portion remaining in the adjacent individual loop.

From the above explanations it follows that in such partial matrices the row and column interference signal is independent of the cores' being in the position shown in FIG. 6 or in a position shifted 90° therefrom. It was stated that the intereference portions of two adjacent cores of an individual loop and of a row ($1a$ and $1b$, for example) compensate each other; therefore, all that is necessary is that such adjacent cores have the same position. The position of the cores also has no effect on the column interference signal, since in each case the magnetic fluxes in the cores, produced by the column selection pulse, saturate the individual loop in the same direction.

If the position of the cores were shifted by 90° from column to column, the interference portions of two adjacent cores would not compensate each other but would add up and the interference portions' direction would be dependent on the cores' position. To this extent it is necessary in the case of such storing devices to speak of two different types of row interference signals, $z$ and $z'$. These two interference signals are generally not the same size. As already stated, an interference signal consists of two portions, which are coupled into the reading loop over the magnetic fields in the air and in the cores. Row interference signal $z$ is thus composed of $z_{core}$ and $z_{air}$.

$$z = z_{core} + z_{air}$$

If the cores in a matrix are turned 90°, only the sign of $z_{core}$ changes. As long as $z_{air}$ does not equal zero, $z'$ cannot coincide in magnitude with $z$. The column interference signal is still independent of the cores' position.

FIG. 7 again shows the same storing device circuit as in FIG. 6, with the wiring supplemented by an inhibition wire D–F–E. In this arrangement the fact that the inhibition wire is led back between the rows from the end of one row to the start of the next is technically unfavorable from a circuitry standpoint. In order to eliminate this drawback, the cores can be made to oppose one another by 90°, row by row, as shown in FIG. 8, so that the inhibition-wire leadbacks between the rows are eliminated. As already explained, shifting the cores by 90° has no effect on interference-signal compensation. The inhibition wire can of course also run parallel to the column call-up wires.

A practical choice of wiring is to have the partial loops of reading and inhibition wire cross vertically, that is, to have the inhibition wire run parallel to the row (column) wires and the reading wire run parallel to the column (row) wires.

The layout of the storing device circuit according to FIG. 8 is such that the row call-up from row to row is conducted alternately by positive and negative call-up pulses and the inhibition wire is led through the rows in the direction of current of these call-up pulses.

Figure 7:
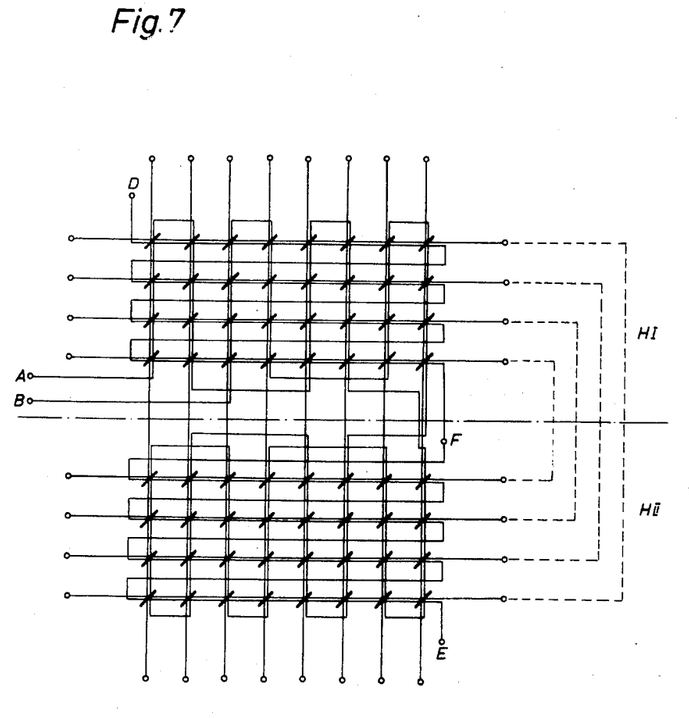
Figure 8:
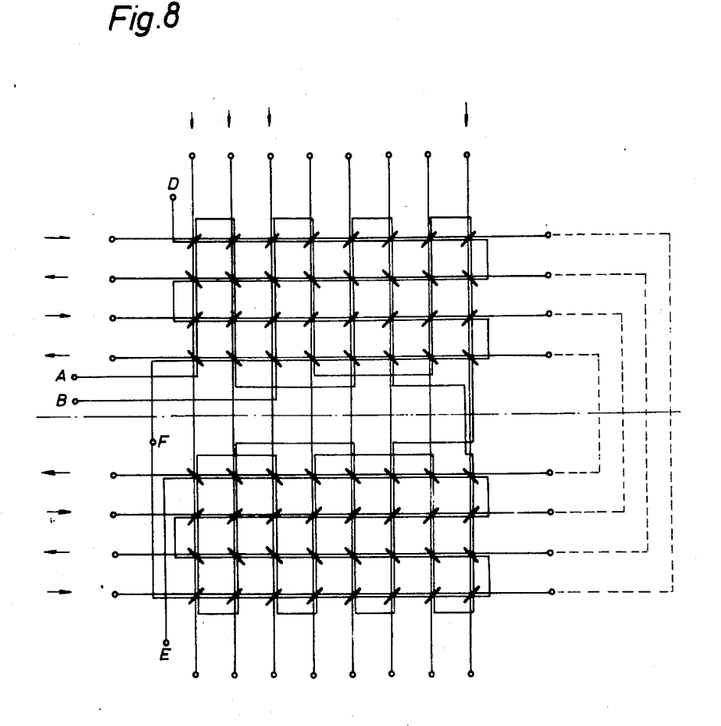

In storing device circuits according to FIGS. 7 and 8, some of the through-switches can be dispensed with by connecting in each case a row wire of the one H1 half with a row wire of the other H2 half. However, in that case, the inhibition wire must be split at point F so that each level is assigned its own inhibition wire and accordingly also its own inhibition generator. For example, if the call-up (writing or reading action) for a core in the upper half H1 is to be inhibited, the inhibition pulse must be led over inhibition wire D–F, but not over F–E, for otherwise in the half H2 that inhibition pulse would coincide with the row pulse.

Storing device circuits of the embodiment type disclosed in FIG. 5 allow a particularly simple wiring.

Figure 9:
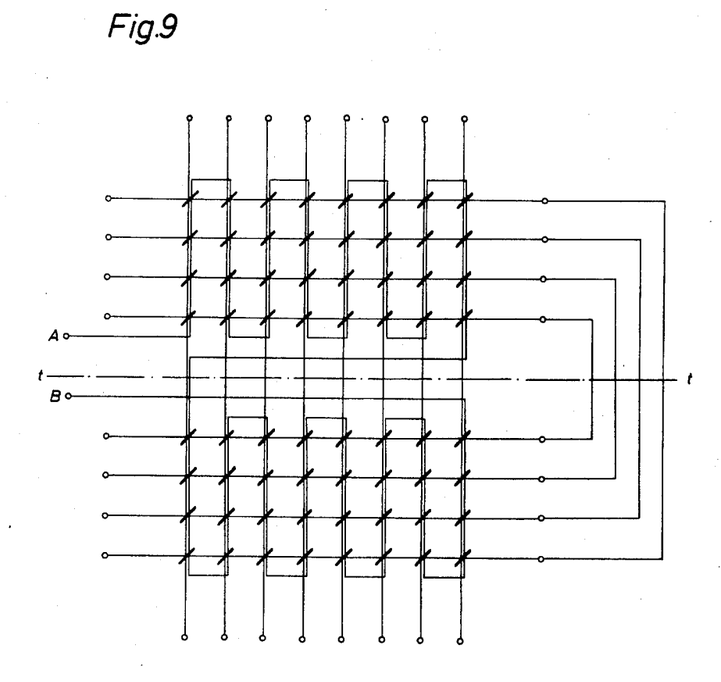

FIG. 9 shows such an arrangement in which the reading wire's individual loops are continuously connected from column to column. Interference-signal compensation, which is conditioned by the row call-up pulse, is brought about by the fact that the residual interference signals of the individual loops in the two storing-device circuit halves separated by a separation line $t$—$t$ are oppositely directed. Column interference signal compensation has already been explained.

The cores' position can be given either as in FIG. 8 or in FIG. 9. It determines how the inhibition wire, left out of FIG. 9 for the sake of clarity, is to run.

The combining of two or four partial matrices into storing device circuits according to the invention can also be used for storing devices of large storage capacity. In that case it is advisable to combine the reading wires of the partial matrices into a self-contained reading loop.

Figure 10:
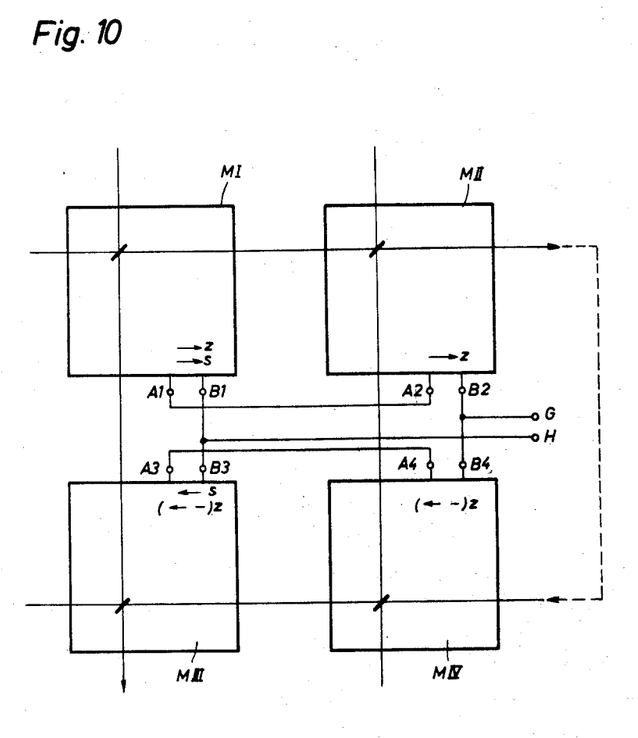

FIG. 10 shows a corresponding further development of the storing device circuit according to FIG. 4. This storing device circuit is made up of four partial matrices MI . . . MIV with the same wiring. The cores of the first and second partial matrices are shifted 90° with respect to the cores of the third and fourth matrices. The row and column wires are so connected that the row call-up pulses can be applied simultaneously to the first and second partial matrices or to the third and fourth partial matrices with the same direction of passage. As the dotted line shows, the economical circuit can also be used here. Furthermore, the column call-up pulses can be simultaneously applied to the first and third or to the second and fourth partial matrices with opposite direction of passage. Since FIG. 10 shows the partial matrices MIII and MIV in mirror-image reading wire position, relative to matrices MI and MII respectively, the column wires, S for example, appear series-connected in the same direction of passage in the drawing. However, it can easily be seen that from an electrical standpoint the direction of passage of the column call-up pulses is opposite, by imagining partial matrices MIII and MIV flipped over upward by 180°.

In the storing device circuit according to FIG. 10, the reading wires of the four partial matrices are combined into a self-contained reading loop B1, A1, A2, B2, B4, A4, A3, B3. The connecting points of the first and third partial matrices MI and MIII and of the second and fourth partial matrices MII and MIV are connected to taps G and H for reading signals.

Figure 11:
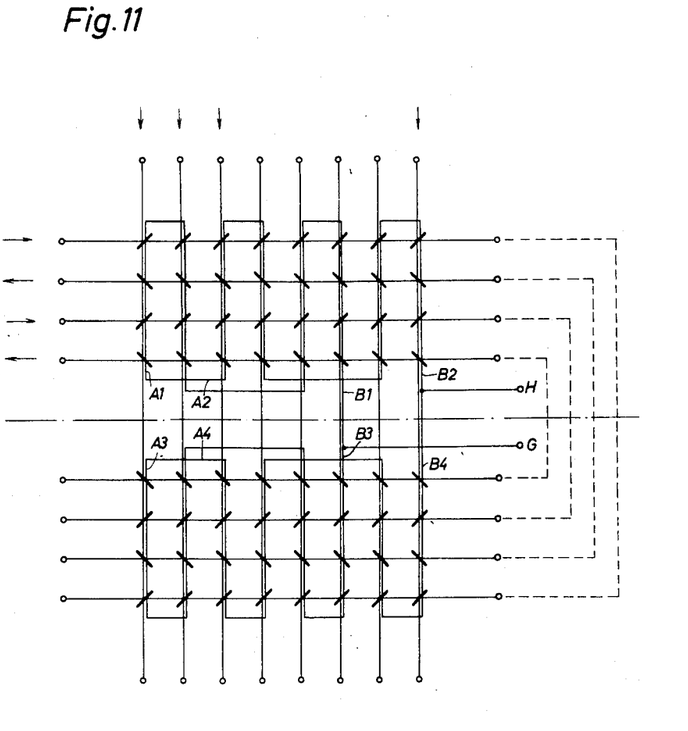

FIG. 11 shows a storing device arrangement especially designed for large storing devices. The reading signals are tapped at points G and H.

Due to the length of the reading wire in large storing devices, the interference signals' transit time must be taken into account, since it also has a great effect on compensation. In the arrangement according to FIG. 11, provision is made for the mutually compensating interference signals to be induced at the same distances from output points G and H so that transit times are the same. Without altering the storing device arrangement, the economical circuit can also be used in this embodiment for the row through-switches, as is shown by the dotted-line connections in FIG. 11.

Figure 12:
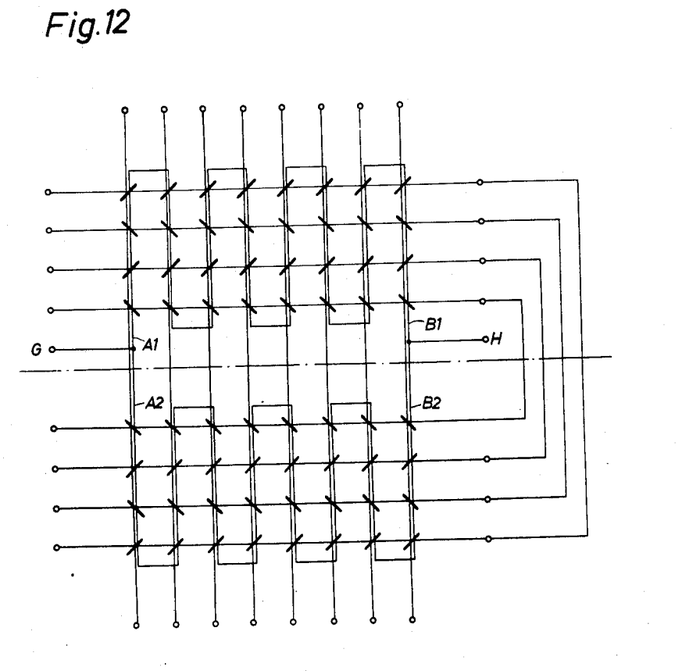

If it is basically desired to use the economical circuit, only two partial matrices are required. This leads to a further embodiment of the invention, the arrangement according to FIG. 12, which represents a modification of the storing device circuit in FIG. 5. Here the reading wire forms a self-contained loop with taps G and H. The cores can all be in the same position or, as shown in FIG. 12, they can be staggered from row to row 90° to one another.

Figure 13:
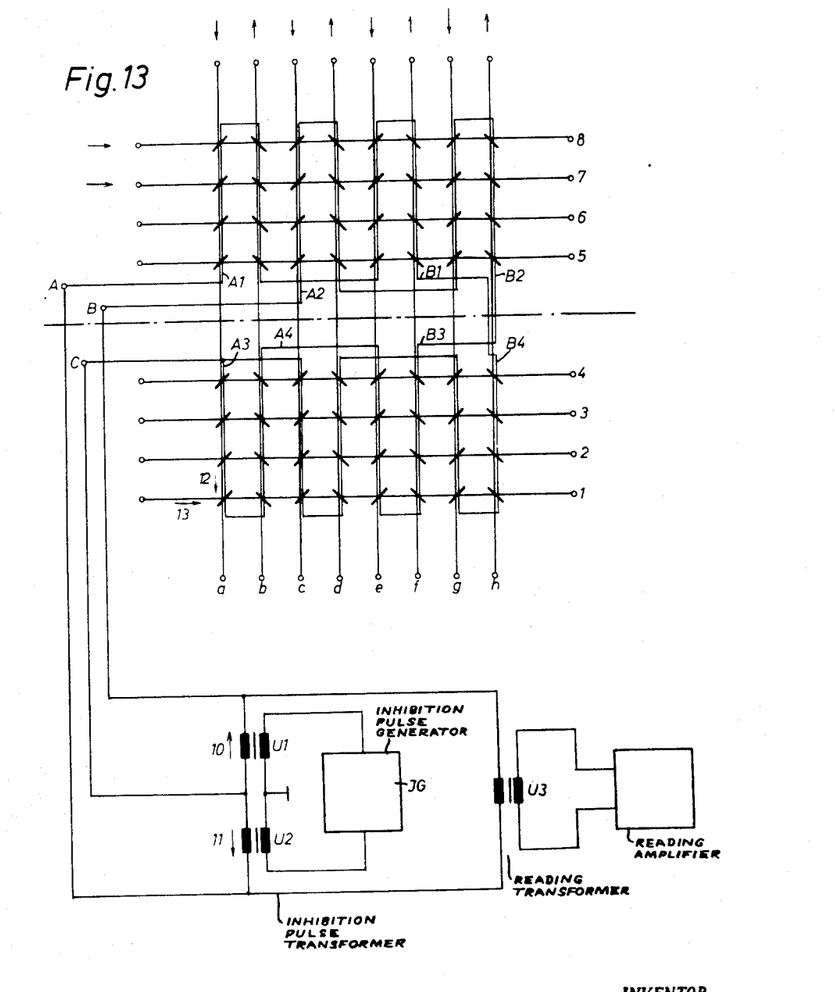
FIGS. 13–15 show embodiments of storing device circuits wherein the reading wire serves at the same time as inhibition wire.

Another object of the invention is inhibition over the reading wire. FIG. 13 shows a storing device arrangement that makes inhibitions over the reading wire possible. The connecting together of the four partial matrices corresponding to the arrangement in FIG. 4 and in FIGS. 6 to 8. The center tapping of the reading loop is led out as point C. At the three connections A, B and C of the reading loop are located the transformers for coupling the inhibition pulses and for tapping the reading signals. As already mentioned, inhibition can be produced in principle over the reading wire, only if the reading wire so passes through the cores that all output signals have the same polarity. Generally, this means that the interference signals are added up within the matrix and are not compensated. In order to be able to maintain the switching-together of a plurality of partial matrices into a storing device circuit according to the invention, the cores are arranged column by column in 90° opposition to one another so that portion A–C of the reading loop always delivers reading signals of like polarity, as does also the portion B–C. Between output points A–B, the interference signals of the one partial loop A–C are offset by those of the other partial loop B–C. While in the previously described storing devices the row interference signals of two adjacent cores of an individual loop compensate one another, here they are added up and compensate one another with the row interference signals of both the cores of the adjacent individual loops. Compensation is therefore not impaired by the changed arrangement of the cores. Inhibition now takes place in that the inhibition pulse from inhibition generator JG over two transformers U1, U2, is separately coupled into the two partial loops A–C and B–C in the direction indicated by arrows 10 and 11, if, for example, core 1a is selected by the writing pulses in the direction of arrows 12 and 13 but the writing action is to be suppressed. The reading amplifier input is no additional load for the inhibition generator, since the potentials at points A and B are the same.

Figure 14:
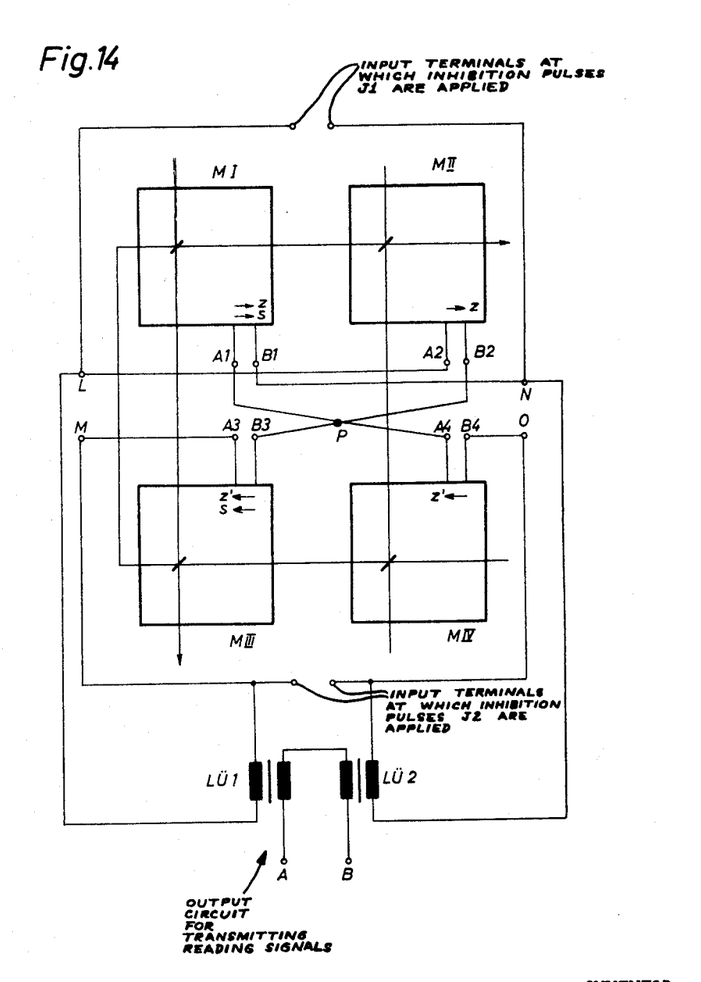

Using the same partial matrices according to FIG. 13, a storing device arrangement according to FIG. 14 can be designed that makes inhibiting over the reading wire possible and is also designed as an economical circuit. Matrices MIII and MIV are in mirror-image reading wire positions relative to matrices I and II, respectively. Since partial matrices of a very special type according to FIG. 13 are used here, in which a 90° turn of the cores causes a change in the row interference signals, the row interference signals of matrices III and IV are marked z' as in previous designs. Inhibiting for MI and MII is done over reading wire L–A2–B2–P–A1–B1–N from a pulse source I1 and for matrices MIII and MIV over reading wire M–A3–B3–P–A4–B4–O from a second pulse source I2. The reading signal is tapped over two separate output transformers LU1 and LU2, whose secondary windings are connected in series and whose primary windings are connected to contacts L–M and N–O.

Interference signals z, z' and s of matrices MII and MIII, which are tapped at points L–M, are added up, as are interference signals z, z' and s of matrices MI and MIV, which are tapped at points N–O. The secondary windings of LU1 and LU2 are so connected in series that at points A–B the interference signals of MI and MIV are offset by the interference signals of MII and MIII. If a core is to be called up in MI or MII but no information is to be received, pulse source I1 sends an inhibition pulse during the call-up process through matrices MI and MII. The same holds true for MIII, MIV and I2.

Figure 15A:
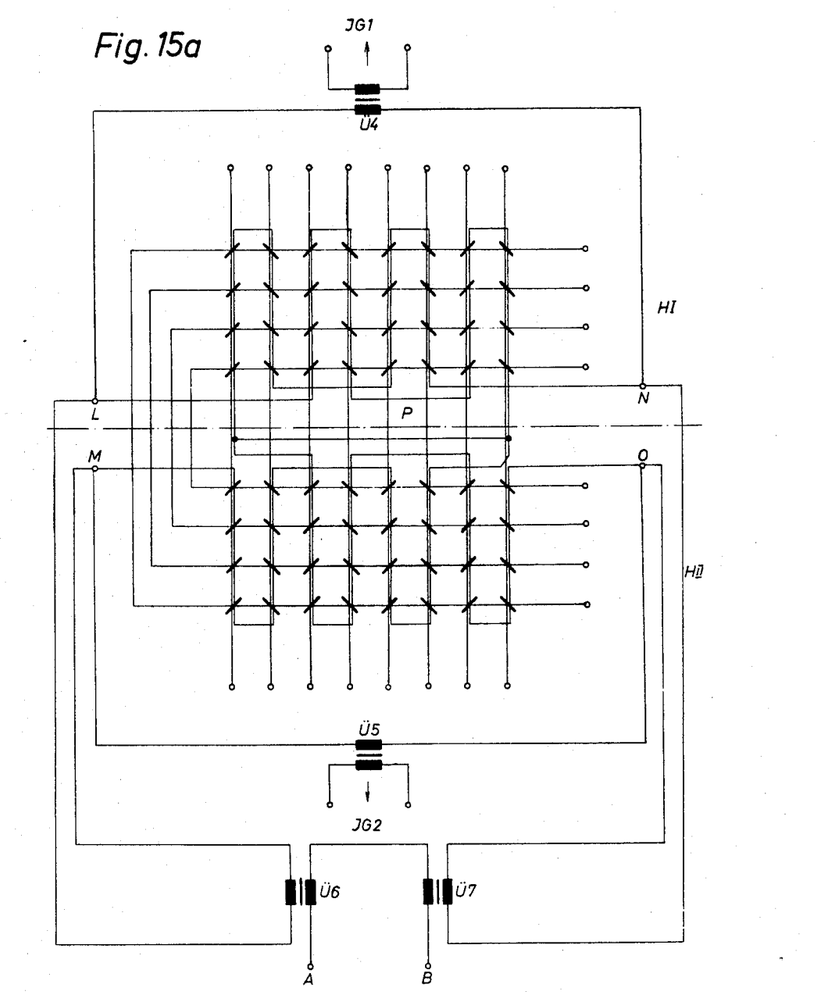

FIG. 15a shows a storing device arrangement according to FIG. 14 in detail.

This storing device circuit provides four partial matrices, as well as two transformers U6 and U7 for reading signals and U4 and U5 for inhibition pulses, which are connected so that the reading wires of the first and fourth partial matrices are connected to the primary winding of the one transformer and the reading wires of the second and third partial matrices are connected to the primary winding of the other transformer for reading signals, combining in each case into a reading loop forming a closed circuit, so that the center taps of both reading loops are galvanically connected, and so that the secondary windings of the transformers for inhibition pulses are alternately series-connected with the primary windings of the transformers for reading pulses into a closed circuit.

Figure 15B:
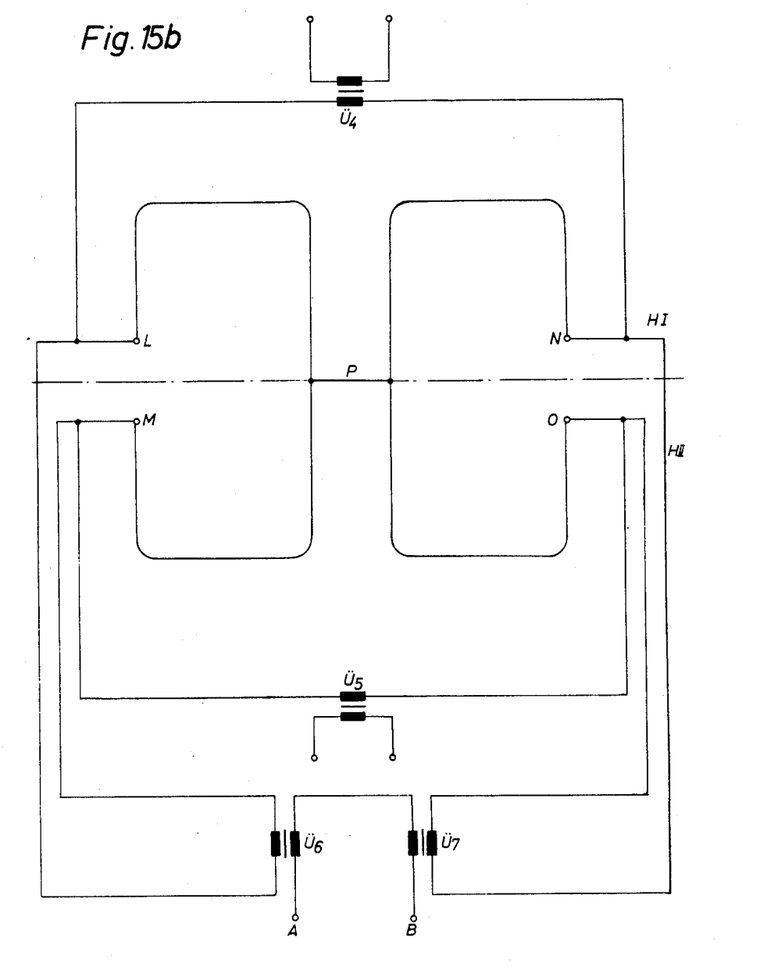

FIG. 15b is a simplified sketch of the reading wire. From point L to N over intermediate connection P it passes through half-level HI, and from point M to O over P through half-level HII of the storing device circuit. The interference pulses of partial loops L–M and N–O have the same polarity and offset each other with the corresponding polarity of transformers U6 and U7 at the input of the reading amplifier, which is connected to contacts A and B. It has already been mentioned that the inhibitions in the case of a matrix with economical circuit must be handled separately for each half-level. The choice of the inhibition generators, which are located at transformers U4 and U5, occurs with the choice of the half-level. For example, if inhibition is to be produced in half-level HI, the inhibition pulse flows through loop section L–P–N. The two transformers U6 and U7 in series, as well as loop section M–P–O, lie parallel to this loop section. As long as the impedance of transformers U6 and U7 is high with respect to the impedance of a loop section, so that no noticeable current split of the inhibition pulse appears at points L and N or during inhibiting in half-level HII at points M and O, this storing device arrangement can be successfully used. Since the impedance of the transformers cannot be made arbitrarily high, this method can be used only with small storing devices. For example, in the case of a matrix with 2000 cores, the losses due to current conduction amount to about 5%. The input resistance of the amplifier (not shown) between points A and B has no effect on the current conduction, since during inhibiting the currents transferred over transformers U6 and U7 to the amplifier side compensate one another. Therefore, practically no difference in potential occurs between points A and B during inhibiting.

I claim:

1. A ferrite matrix storing device comprising a plurality of cores arranged in at least two partial matrices of similar core arrangements, a group of row wires and a group of column wires for each partial matrix threading the cores thereof and adapted to have half-current call-up pulses applied to them for selectively saturating any core by the coincident application of said half-current call-up pulses to its row and column wires in a predetermined direction, a common reading wire threading all said cores, said wire being threaded parallel to one of the groups of row wires and column wires within each partial matrix, said row wires being arranged to apply positive and negative call-up pulses alternately from row to row in each partial matrix, the cores in each said partial matrix being shifted by 90° from row to row and said reading wire passing in the current direction of the call-up pulses through the rows, means for utilizing the reading wire of the individual partial matrices also as an inhibition wire, and means connecting said reading wire between partial matrices so that interference signals induced in said reading wire by the half-current call-up pulses in one partial matrix will be compensated by the interference signals induced in said reading wire by the half-current call-up pulses in another partial matrix.

2. A ferrite matrix storing device comprising a plurality of cores arranged in four partial matrices with like wiring, a group of row wires and a group of column wires for each partial matrix threading the cores thereof and adapted to have half-current call-up pulses applied to them for selectively saturating any core by the coincident application of said half-current call-up pulses to its row and column wires in a predetermined direction, the row and column wires of adjacent matrices being connected in pairs such that the call-up pulses assigned to a row and a column wire of a given partial matrix are simultaneously assigned to the corresponding row wire of a partial matrix adjacent one side of said given matrix and to the corresponding column wire of still another partial matrix adjacent another side of said given matrix, a common reading wire threading all said cores, said reading wire being threaded similarly through the cores within each partial matrix, each two of the four partial matrices whose row wires are connected being so combined into one matrix that the reading loops passing through the first and second, fifth and sixth, etc., columns form the reading wire of the one partial matrix, and the reading loops passing through the third and fourth, seventh and eighth, etc., columns form the reading wire of the other partial matrix, and means for connecting said reading wire between partial matrices so that interference signals induced in said reading wire by the half-current call-up pulses in one partial matrix will be compensated by the interference signals induced in said reading wire by the half-current call-up pulses in another partial matrix.

3. A ferrite matrix storing device comprising four partial matrices of similar core arrangements, a group of row wires and a group of column wires for each partial matrix threading the cores thereof and adapted to have half-current call-up pulses applied to them for selectively saturating any core by the coincident application of said half-current call-up pulses to its row and column wires in a predetermined direction, the cores of the first and second partial matrices and the cores of the third and fourth partial matrices being showed 90° with respect to one another, the row and column wires being so connected that the row call-up pulses can be simultaneously applied to the first and second partial matrices with the same direction of passage and to the third and fourth partial matrices with opposite direction of passage, and the column call-up pulses can be simultaneously assigned to the first and third or second and fourth partial matrices with opposite direction of passage, a common reading wire threading all said cores said wire being threaded similarly through all cores within each partial matrix, the reading wires of the four partial matrices being connected together to form a self-contained reading loop passing through the first, second, fourth, and third partial matrices in that order, and back to the first again and in which connections are made to the reading wires at a point between the first and third partial matrices and a point between the second and fourth partial matrices, said reading wire being so connected between partial matrices that interference signals induced in said reading wire by the half-current call-up pulses in one partial matrix will be compensated by the interference signals induced in said reading wire by the half-current call-up pulses in another partial matrix.

4. A ferrite matrix storing device comprising a plurality of cores arranged in two partial matrices of similar core arrangements, a group of row wires and a group of column wires for each partial matrix threading the cores thereof and adapted to have half-current call-up pulses applied to them for selectively saturating any core by the coincident application of said half-current call-up pulses to its row and column wires in a predetermined direction, the two partial matrices being similarly wired but with the cores of one partial matrix at a 90° angle relative to those of the other, and with the row and column wires of both partial matrices so connected in pairs that the call-up pulses are simultaneously applied to both partial matrices with opposite direction of passage, a common reading wire threading all said cores parallel to the column wires within each said partial matrix, the reading wires of the two partial matrices being connected in a self-contained reading loop, outside connections being made at points where the reading wires pass between the partial matrices, and said reading wire being connected between partial matrices so that interference signals induced in said reading wire by the half-current call-up pulses in one partial matrix will be compensated by the interference signals induced in said reading wire by the half-current call-up pulses in the other partial matrix.

5. A ferrite matrix storing device comprising four partial matrices with like wiring, a group of row wires and a group of column wires for each partial matrix threading the cores thereof and adapted to have half-current call-up pulses applied to them for selectively saturating any core by the coincident application of said half-current call-up pulses to its row and column wires in a predetermined direction, the row and column wires of adjacent matrices being connected in pairs such that the call-up pulses assigned to a row and a column wire of a given partial matrix are simultaneously assigned to the corresponding row wire of a partial matrix adjacent the given matrix on one side thereof and to the corresponding column wire of still another partial matrix adjacent another side of said given matrix, a common reading wire threading all said cores, said reading wire being threaded similarly through all cores within each partial matrix, said reading wires of said partial matrices being connected together to form a reading loop having reading-signal outputs and a center tap over which inhibition pulses can be applied to either half of the reading loop in connection with the one or the other reading-signal output, said reading wire being connected between partial matrices so that interference signals induced in said reading wire by the half-current call-up pulses is one partial matrix will be compensated by the interference signals induced in said reading wire by the half-current call-up pulses in another partial matrix.

6. A ferrite matrix storing device comprising a plurality of cores arranged in four partial matrices of similar core arrangements, a group of row wires and a group of column wires for each partial matrix threading the cores thereof and adapted to have half-current call-up pulses applied to them for selectively saturating any core by the coincident application of said half-current call-up pulses to its row and column wires in a predetermined direction, a common reading wire threading all said cores said reading wire being similarly threaded through all of the cores within each partial matrix, the reading wires of the first and fourth partial matrices being connected in series to form a first loop and the reading wires of the second and third partial matrices being connected to series to form a second loop, the mid-points of said loops being galvanically connected, said device further comprising two reading transformers and two inhibiting transformers, said first loop being connected across the primary winding of one of said reading transformers and said second loop being connected across the primary winding of the other of said reading transformers, the secondary windings of said reading transformers being connected in series, the secondary winding of one of said inhibiting transformers being connected between corresponding ends of the primary windings of said reading transformers, while the secondary winding of the other inhibiting transformer is connected between the other corresponding ends of said primary windings of said reading transformers, said reading wire being connected between partial matrices so that interference signals induced in said reading wire by the half-current call-up pulses in one partial matrix will be compensated by interference signals induced in said reading wire by the half-current call-up pulses in another partial matrix.

References Cited in the file of this patent

UNITED STATES PATENTS

| | | |
|---|---|---|
| 2,785,389 | Warren | Mar. 12, 1957 |
| 2,880,406 | Bindon et al. | Mar. 31, 1959 |
| 2,929,050 | Russell | Mar. 15, 1960 |
| 3,021,511 | Vinal | Feb. 13, 1962 |

FOREIGN PATENTS

| | | |
|---|---|---|
| 1,167,591 | France | Aug. 11, 1958 |

OTHER REFERENCES

"Magnetic Memory Package," by D. E. Elder in "IBM Technical Disclosure Bulletin," vol. 1, No. 5, February 1959.

"Interlocking Segmentation of Large Memories," by R. R. Booth in "IBM Technical Disclosure Bulletin," vol. 1, No. 6, April 1959.